US007433847B2

(12) United States Patent
Pauly

(10) Patent No.: US 7,433,847 B2
(45) Date of Patent: Oct. 7, 2008

(54) SYSTEM AND METHOD FOR MANUFACTURING AND SECURING TRANSPORT OF POSTAGE PRINTING DEVICES

(75) Inventor: Steven J. Pauly, New Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 794 days.

(21) Appl. No.: 10/946,871

(22) Filed: Sep. 22, 2004

(65) Prior Publication Data

US 2006/0064390 A1 Mar. 23, 2006

(51) Int. Cl.
*G06Q 99/00* (2006.01)
*G06F 21/00* (2006.01)

(52) U.S. Cl. .......................... 705/60; 705/401; 705/410

(58) Field of Classification Search .............. 705/50-79
See application file for complete search history.

(56) References Cited

U.S. PATENT DOCUMENTS

| | | | | |
|---|---|---|---|---|
| 5,742,682 A * | 4/1998 | Baker et al. | 380/277 |
| 5,799,086 A * | 8/1998 | Sudia | 705/76 |
| 6,041,317 A | 3/2000 | Brookner | |
| 6,424,954 B1 * | 7/2002 | Leon | 705/401 |
| 7,203,835 B2 * | 4/2007 | Multerer et al. | 713/168 |
| 2002/0046175 A1 * | 4/2002 | Bleumer | 705/51 |

OTHER PUBLICATIONS

Menezes, van Oorshot, Vanstone, Handbook of Applied Cryptography, CRC Press LLC, Washington, D.C., 1997,§§1.11.3, 10.1.1, 10.3.3, 12.5.2, and 13.4.2.*

Menezes, van Oorschot, Vanstone, Handbook of Applied Cryptography, CRC Press LLC, Washington, D.C., 1997,§§1.11.3, 10.1.1, 10.3.3, 12.5.2, and 13.4.2.*

American National Standard X9.62, Public Key Cryptography for the Financial Services Industry: The Elliptical Curve Digital Signature Algorithm, draft dated Sep. 20, 1998.

American National Standard X9.63, Public Key Cryptography for the Financial Services Industry: Key Agreement and Key Transport Using Elliptical Curve Cryptography, draft dated Jan. 8, 1999.

* cited by examiner

*Primary Examiner*—Andrew J. Fischer
*Assistant Examiner*—Jacob C Coppola
(74) *Attorney, Agent, or Firm*—Brian A. Lemm; Angelo N. Chaclas

(57) ABSTRACT

A method of manufacturing a postage printing device that is to be registered by a registering entity having a public/private key pair. The manufacturing station has a manufacturing station public/private key pair. The method includes storing a root certificate comprising the registering entity public key signed by the registering entity private key in the postage printing device, generating a transport public/private key pair, and storing the transport private key in the postage printing device. The method also includes generating a transport certificate comprising the transport public key signed by the manufacturing station private key, and storing the transport certificate in the postage printing device, after which the postage printing device is set to a transport lock state so that it can be securely transported. Also, a method of registering a postage printing device manufactured in this manner prior to operation of the postage printing device.

16 Claims, 7 Drawing Sheets

SYSTEM AND METHOD FOR MANUFACTURING AND SECURING TRANSPORT OF POSTAGE PRINTING DEVICES

FIELD OF THE INVENTION

The present invention relates to a system and method for manufacturing and securing the transport of postage printing devices such as a postal security device or a dedicated postage printer. The present invention also relates to a system and method for mutually authenticating such a postage printing device and a registering entity's computer infrastructure before placing the postage printing device into operation.

BACKGROUND OF THE INVENTION

Postage metering systems are well known in the art. A postage metering system applies evidence of postage, commonly referred to as postal indicia, to an envelope or other mailpiece and accounts for the value of the postage dispensed.

Presently, there are two postage metering system types: closed systems and open systems. In a closed system, the system functionality is solely dedicated to postage metering activity. Examples of closed metering systems include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open metering systems include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification.

Conventional analog closed system postage meters (both mechanical and electronic) have heretofore physically secured the link between printing and accounting. The integrity of the physical meter box has been monitored by periodic inspections of the meters. Digital closed system postage meters typically include a dedicated digital printer coupled to a metering (accounting) device, which is referred to herein as a postal security device (PSD). Digital printing postage meters have removed the need for the physical inspection that was required with analog systems by cryptographically securing the link between the accounting and printing mechanisms. In essence, digital printing postage meters create a secure point to point communication link between the accounting unit and printhead.

In such digital closed systems, the dedicated printer and PSD may be located in the same device and/or at the same location when placed in operation. Alternatively, the dedicated printer may be located in a first location (i.e., the local location where indicia are to be printed), and the PSD may be located in a remote location, such as a provider's data center. In the latter situation, it is still necessary for the dedicated printer to be a secure device having cryptographic capabilities so that postage printing information, such as an indicia, received from the PSD, and the PSD itself, can be authenticated. As used herein, the term "postage printing device" shall refer to: (i) a PSD that forms a part of a closed system; (ii) a closed system device that includes a PSD and one or more other components, such as a printer; and (iii) a secure dedicated printer that forms part of a closed system, such as a system where the PSD is located at a remote location.

Currently, secret key cryptography techniques are used to secure new postage printing devices between the time that they are manufactured and the time they are registered and initialized or parameterized for operation at a location such as the office or home of the user. Specifically, secret key cryptography is used to lock postage printing devices after they are manufactured and before they are transported to the parameterization location and to unlock postage printing devices once they have securely reached the parameterization location. The secret keys that are used in this process are derived from a master key that must be known to both the party manufacturing the postage printing device and the party initializing the postage printing device for operation. Any compromise of the master key could compromise the security of all of the postage printing devices that are manufactured. It is therefore necessary to maintain strict control over the master key to prevent such compromise. This is more easily accomplished if the provider of the postage printing devices both manufactures the devices and initializes the devices for operation. However, due to cost concerns, manufacturing is now frequently done by parties other than the provider at locations remote and separate from the provider. Use of the conventional secret key method in this situation presents significant security risks, as each manufacturing facility must have knowledge of the master key. A business model of having all of the devices manufactured by third parties (without any key information) first shipped to the provider for the loading of cryptographic key information before shipping them to the consumer is cost prohibitive. Thus, a system and method for securely manufacturing postage printing devices at a third party location and shipping the devices to a parameterization location prior to being placed into service is needed.

SUMMARY OF THE INVENTION

The present invention relates to a method of manufacturing a postage printing device such as a PSD or a dedicated printer used in a closed postage metering system. The postage printing device is manufactured at a manufacturing station and is to be registered for operation under the authority of a registering entity such as a provider of the postage printing device. The registering entity has a registering entity public/private key pair, and the manufacturing station has a manufacturing station public/private key pair. The method includes storing a root certificate in the postage printing device, wherein the root certificate comprises the registering entity public key signed by the registering entity private key. The method further includes generating a transport public/private key pair for the postage printing device, and storing at least the transport private key in the postage printing device. The method also includes generating a transport certificate, wherein the transport certificate comprises the transport public key signed by the manufacturing station private key, and storing the transport certificate in the postage printing device. After the transport certificate is stored in the postage printing device, the postage printing device is set to a transport lock state so that it can be securely transported.

Preferably, the step of generating the transport public/private key pair is performed by the postage printing device. In addition, the manufacturing station preferably includes a secure coprocessor, and the manufacturing station public/private key pair is associated with and unique to the secure coprocessor. In this embodiment, the transport certificate is generated by the secure coprocessor and is sent to the postage printing device. Also in this embodiment, before the step of generating the transport certificate, the method further comprises the postage printing device generating a transport certificate request that is sent to the secure coprocessor, and the secure coprocessor verifies the transport certificate request.

Moreover, before the step of storing the transport certificate in the postage printing device, the method preferably further includes the manufacturing station sending a manufacturing certificate to the postage printing device, wherein the manufacturing certificate comprises the manufacturing station public key signed by the registering entity private key, and the postage printing device verifying the manufacture certificate using the root certificate and verifying the transport certificate using the manufacturing certificate.

In the preferred embodiment, the manufacturing station includes a manufacturing station computer coupled to a secure coprocessor. In addition, the registering entity is a provider of the postage printing device and operates the computer system that registers the postage printing device.

In one embodiment, the method is also for registering the postage printing device prior to it being placed in operation. In this embodiment, the method further includes generating an operation public/private key pair for the postage printing device, generating an operation certificate, wherein the operation certificate comprises the operation public key signed by a postal authority private key, and storing the operation certificate in the postage printing device. This method may further include verifying the transport certificate before the operation certificate is generated, and verifying the operation certificate before it is stored using a domain certificate, wherein the domain certificate includes a postal authority public key corresponding to the postal authority private key signed by the registering entity private key. This domain certificate may be verified using the root certificate, and in particular the registering entity public key contained therein. The method may also further include the postage printing device and a registration computer system exchanging first and second challenges and exchanging and verifying first and second corresponding key proofs. Finally, the method may further include deleting the transport certificate from the postage printing device to remove any association of the postage metering device to its location of manufacture.

Another aspect of the invention relates to a postage printing device that was manufactured at a manufacturing station that has a manufacturing station public/private key pair. The postage printing device is to be registered for operation under the authority of a registering entity that has a registering entity public/private key pair. The postage printing device includes a memory that stores a root certificate, a transport private key, and a transport certificate. The root certificate includes the registering entity public key signed by the registering entity private key. The transport private key is the private key of a transport public/private key pair, and the transport certificate includes the transport public key signed by the manufacturing station private key.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

The present invention utilizes public key cryptography techniques to enable postage printing devices to be manufactured by a third party (other than the provider of the postage printing device) and shipped by the third party to a registration and parameterization location in a secure manner. The present invention also utilizes public key cryptography techniques to mutually authenticate a postage printing device and a registering party, such as the provider, that provides parameterization data for the postage printing device. Thus, at the outset, it will be helpful to describe certain public key cryptography terminology and symbology that will be used herein. As is known, public key cryptography utilizes pairs of corresponding cryptographic keys, i.e., a public key and a private key (referred to as a public/private key pair). When a public/private key pair is described herein, the following symbols will be used: ($P_X$, $P'_X$), where $P_X$ is X's public key, and $P'_X$ is X's private key. In addition, public key cryptography makes use of digital signatures to authenticate data. A digital signature of a piece of data Y consists of a hash, preferably a one-way hash, of the data Y that is encrypted by a particular private key. Thus, when used herein, the phrase "Y signed by private key $P'_X$" or something similar means that a record or data element is created that includes: (1) the data Y, and (2) a digital signature of the data Y created using the private key $P'_X$ (Y is hashed and then encrypted with $P'_X$). In addition, reference is made herein to a number of public key certificates. Those public key certificates include a particular public key signed by a particular private key, meaning the certificate comprises a data element including: (1) the particular public key, and (2) a digital signature of the particular public key created with the particular private key. The symbol $[P_X]$ $P'_Y$ is used herein to refer to a public key certificate for X which includes X's public key ($P_X$) and a digital signature of ($P_X$) created by Y's private key ($P'_Y$).

Moreover, reference is made herein to validation of keys and verification of various types of signed data, such as the certificate $[P_X]$ $P'_Y$ described above. As used herein, validation means the validation of public keys for key integrity tests. Verification of signed data means that the signature is verified using a key, i.e., signed data is authenticated using the public key corresponding to the private key used to create the associated digital signature. In particular, in the case of $[P_X]$ $P'_Y$, a hash of $P_X$ is created, the digital signature is decrypted using $P_Y$ (to obtain the originally created hash), and the two hashes are compared to one another. Other terms used herein shall be given the meaning generally understood in the field of public key cryptography.

Figure 1:
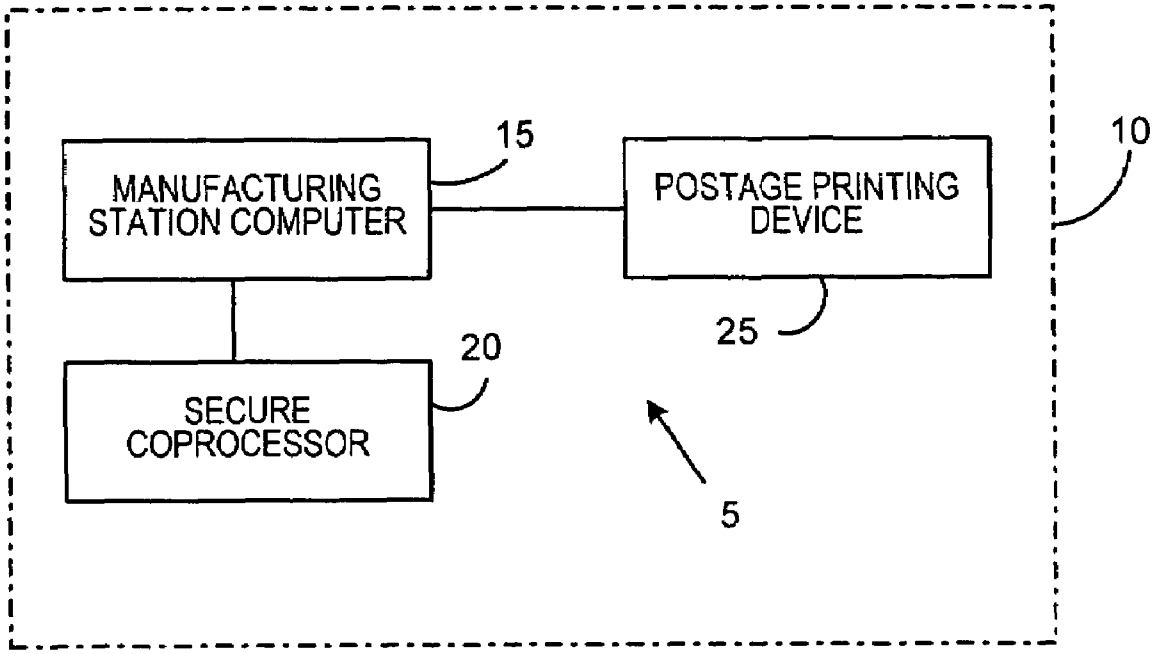
FIG. 1 is a block diagram of a system for manufacturing a postage printing device according to the present invention.

FIG. 1 is a block diagram of a system 5 for manufacturing postage printing devices according to the present invention. System 5 is located at a manufacturer location 10 that is preferably operated by a party other than the provider or vendor of the postage printing devices being manufactured, and is located remotely from the provider. While FIG. 1 shows only one manufacturing system 5 at manufacturer location 10, there may be multiple manufacturing systems 5 at any one manufacturer location 10. System 5 includes manufacturing station computer 15, which may be any type of general purpose computing device such as a personal computer (PC) or a PC in communication with a server computer. Coupled to manufacturing station computer 15 is secure coprocessor 20. Secure coprocessor may be a component separate from manufacturing station computer 15 or may be integral with manufacturing station computer 15. Preferably, secure coprocessor 20 is a separate component provided by the provider or vendor of the postage printing devices being manufactured. Together, manufacturing station computer 15 and secure coprocessor 20 may be referred to as a manufacturing station. Finally, system 5 includes postage printing device that is one of the postage printing devices that is being manufactured at manufacturer location 10. As seen in FIG. 1, postage printing device 25 is coupled to manufacturing station computer 15.

Figure 2:
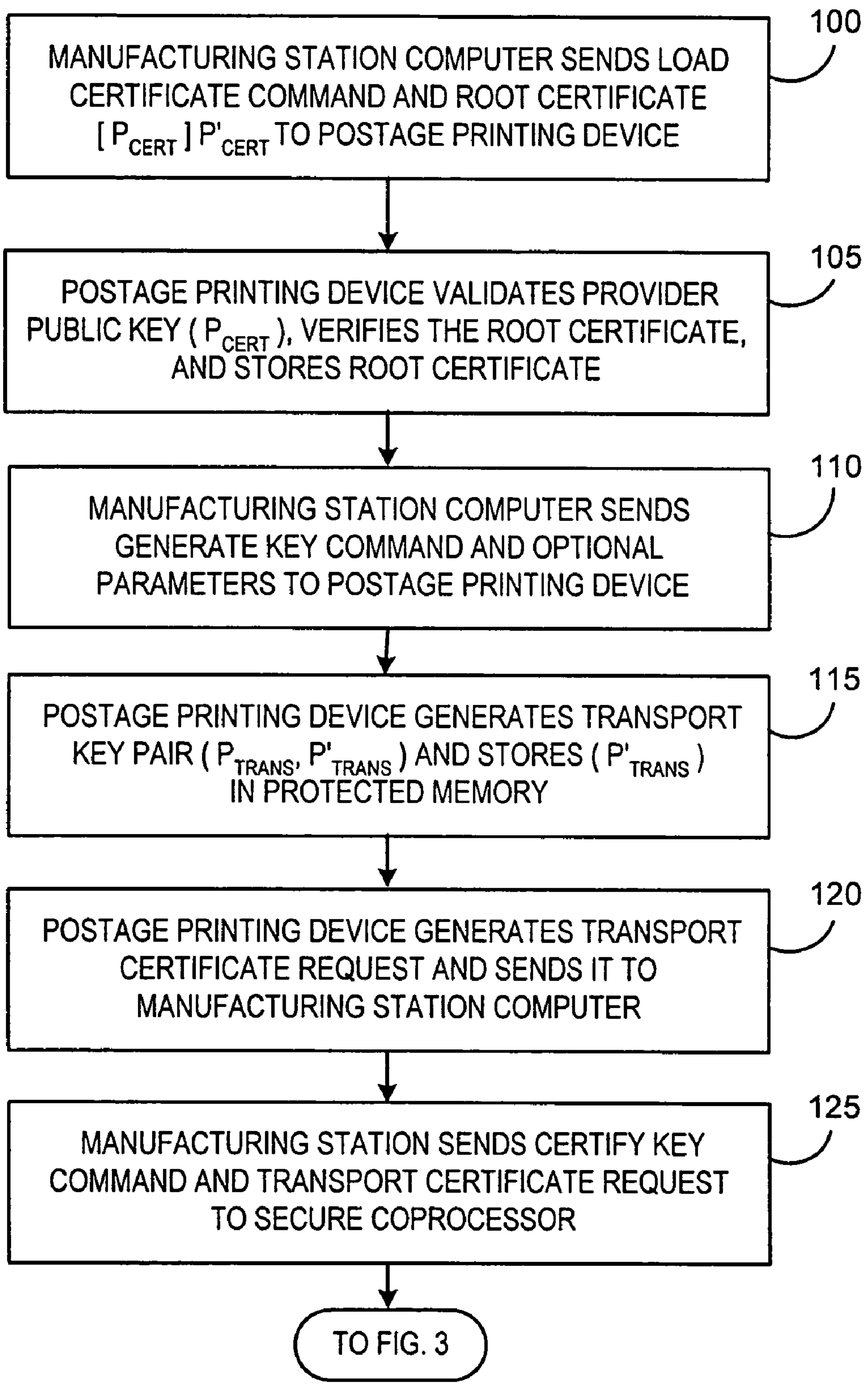
FIGS. 2 and 3 are flowcharts depicting a method of manufacturing a postage printing device according to the present invention.
Figure 3:
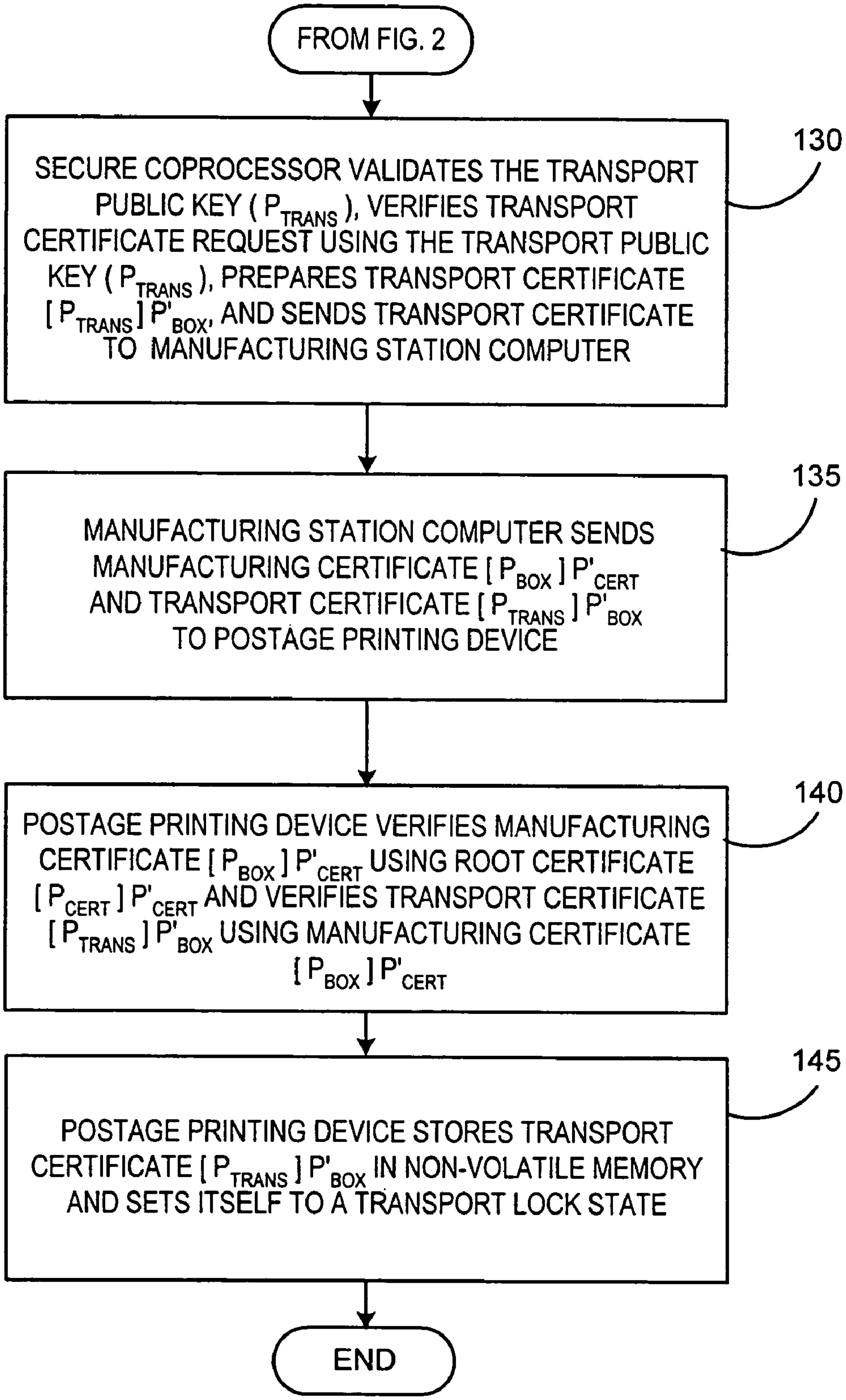

Referring to FIGS. 2 and 3, a flowchart depicting a method of manufacturing postage printing device 25 according to the present invention is shown. As will be appreciated, the steps shown in FIGS. 2 and 3 constitute only a portion of the entire process of manufacturing postage printing device 25, and other manufacturing steps are performed prior to the steps shown in FIGS. 2 and 3.

Before the manufacturing steps shown in FIGS. 2 and 3 may be performed, manufacturing station computer 15 and secure coprocessor 20 must be provided with certain information. In particular, the provider or vendor of the postage printing devices to be manufactured by system 5 generates a provider public/private key pair ($P_{cert}$, $P'_{cert}$) and creates a root certificate $[P_{cert}]$ $P'_{cert}$, which is the provider public key signed with the provider private key. The root certificate is provided to the manufacturer and is loaded into manufacturing station computer 15. In addition, secure coprocessor 20, sometimes commonly referred to as a "box," has its own unique public/private key pair ($P_{box}$, $P'_{box}$), that is preferably generated and loaded into secure coprocessor 20 by the provider. Also, manufacturing station computer 15 is provided with a manufacturing certificate $[P_{box}]$ $P'_{cert}$.

Referring again to FIG. 2, the method begins at step 100 where manufacturing station computer 15 sends a load certificate command and the root certificate $[P_{cert}]$ $P'_{cert}$ to postage printing device 25. Next, at step 105, postage printing device 25 validates the provider public key ($P_{cert}$), verifies the root certificate, and stores the root certificate. Then, at step 110, manufacturing station computer 15 sends a generate key command and, preferably, certain cryptographic operational parameters to postage printing device 25. In response, postage printing device 25, as shown in step 115, generates a transport public/private key pair ($P_{trans}$, $P'_{trans}$), and stores the private transport key, $P'_{trans}$, in protected memory. At step 120, postage printing device 25 next generates a transport certificate request, which preferably consists of an ID for postage printing device 25 and the public transport key ($P_{trans}$) signed with the private transport key ($P'_{trans}$), and sends the transport certificate request to manufacturing station computer 15. Manufacturing station computer 15 then sends a certify key command and the transport certificate request to secure coprocessor 20 at step 125.

Referring to FIG. 3, at step 130, secure coprocessor 20 validates the transport public key ($P_{trans}$) to ensure that it complies with required operating parameters using, for example, and known public key validation algorithm. Also, at step 130, secure coprocessor 20 verifies the transport certificate request using the public transport key ($P_{trans}$), prepares a transport certificate $[P_{trans}]$ $P'_{box}$, and sends the transport certificate to manufacturing station computer 15. As will be appreciated, the transport certificate securely associates the public transport key ($P_{trans}$) with the particular secure processor 20. Next, at step 135, manufacturing station computer 15 sends the manufacturing certificate $[P_{box}]$ $P'_{cert}$ and the transport certificate $[P_{trans}]$ $P'_{box}$ to postage printing device 25.

As step 140, postage printing device 25 verifies the manufacturing certificate $[P_{box}]$ $P'_{cert}$ using the root certificate $[P_{cert}]$ $P'_{cert}$, and verifies the transport certificate $[P_{trans}]$ $P'_{box}$ using the manufacturing certificate $[P_{box}]$ $P'_{cert}$. Next, at step 145, postage printing device 25 stores the transport certificate $[P_{trans}]$ $P'_{box}$ in non-volatile memory and sets itself to a transport lock state. Once in the transport lock state, postage printing device 25 cannot operated until unlocked with an appropriate command. At this point, manufacturing is complete and postage printing device 25 is ready to be shipped. As seen from the steps above, postage printing device 25, when shipped, will include the following stored information: the root certificate $[P_{cert}]$ $P'_{cert}$ the transport public/private key pair ($P_{trans}$, $P'_{trans}$) and the transport certificate $[P_{trans}]$ $P'_{box}$.

Once manufactured, postage printing device 25 must be registered and parameterized before being placed into operation. These steps involve authenticating, unlocking, and loading certain cryptographic and operational information into postage printing device 25. The registration and parameterization of postage printing device 25 requires that it communicate with the computer infrastructure of an authorized registering and parameterizing entity. Preferably, the authorized registering and parameterizing entity is the provider.

Figure 4:
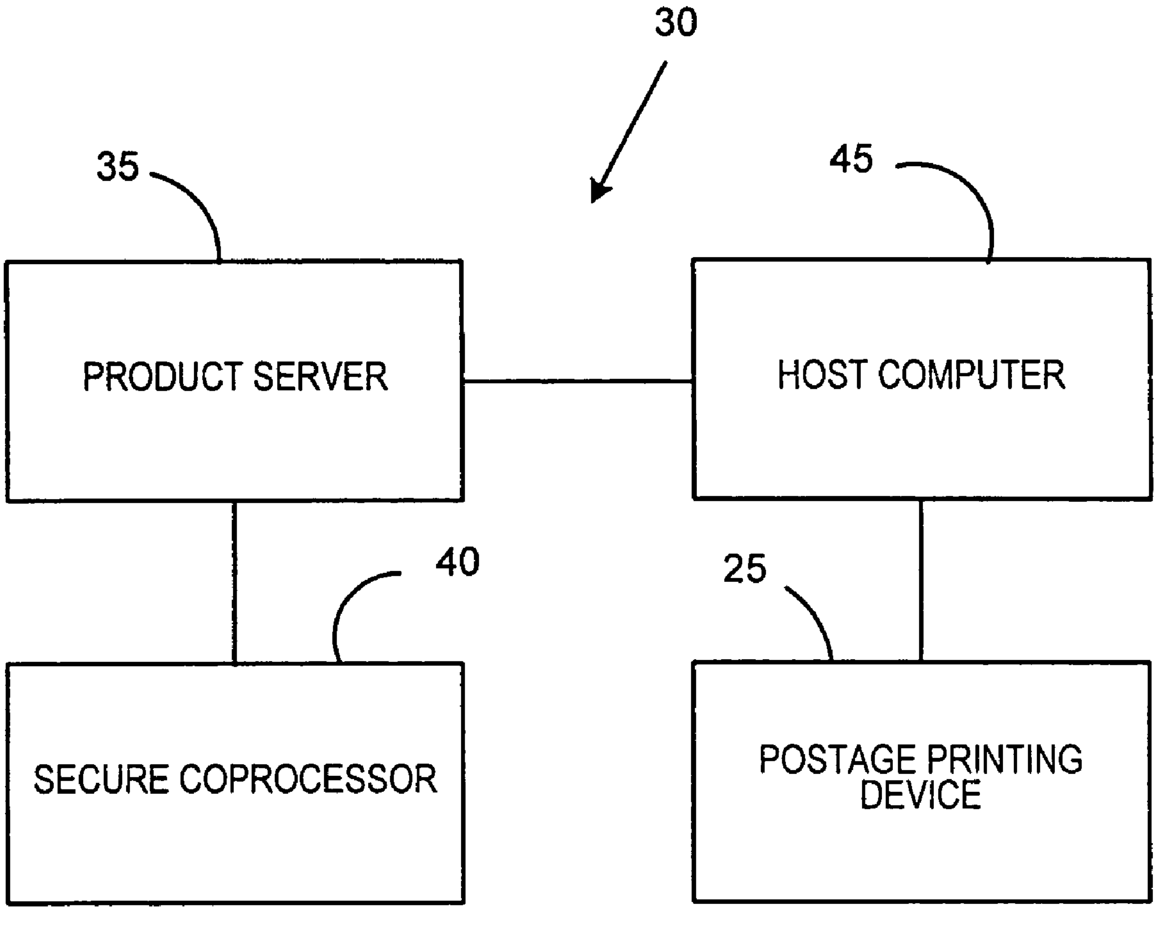
FIG. 4 is a block diagram of a system for authenticating and registering a postage printing device according to the present invention.

FIG. 4 is a block diagram of a preferred embodiment of a system for authenticating and registering and parameterizing postage security device 25 according to the present invention. System 30 includes product server 35 located at the registering entity's location, which is preferably the provider's location. Product server 35 is a general purpose computing device such as a server computer or a PC. Secure coprocessor 40 is coupled to product server 35. System 30 also includes host computer 45, which may be a general purpose computing device such as a PC or a server computer. As seen in FIG. 4, postage printing device 25 is coupled to host computer 45 during the registration and parameterization process. Host computer 45 is the component that enables postage printing device 25 to communicate with product server 35. Preferably, host computer 45 is located at the location at which postage printing device 25 is to be used by a user, such as a home or office. Postage printing device is shipped to this location in a secure manner after the steps of FIGS. 2 and 3 have been completed. In this case, host computer 45 may communicate with product server 35 in any of a number of known ways, such as by modem or through the Internet. Host computer 45 may, however, be located anywhere, even at the provider's facility in a case where a large number of postage printing devices 25 are to be registered and parameterized by the provider before being shipped to users.

Figure 5:
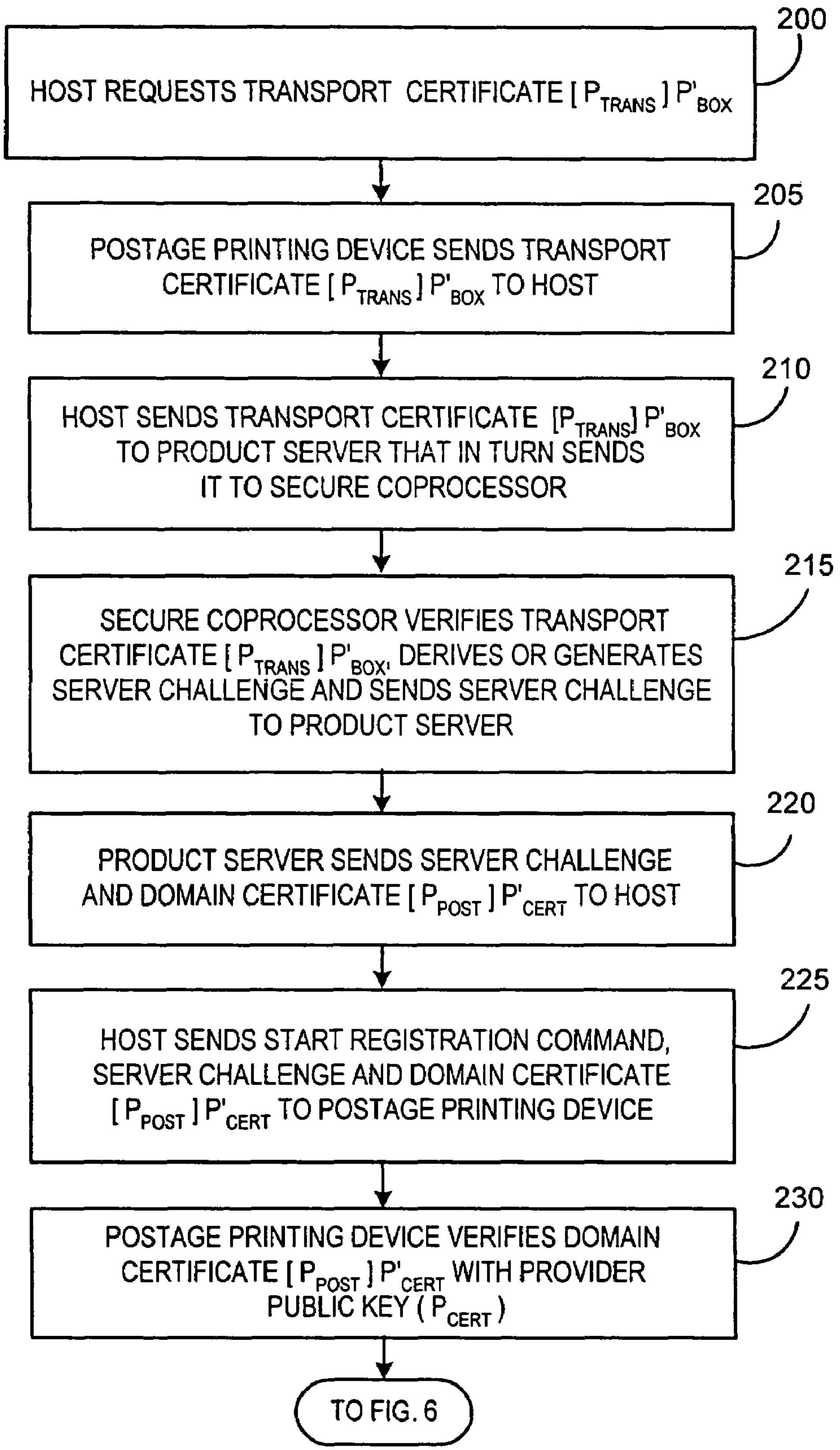
FIGS. 5, 6 and 7 are flowcharts depicting a method of authenticating and registering a postage printing device according to the present invention.
Figure 6:
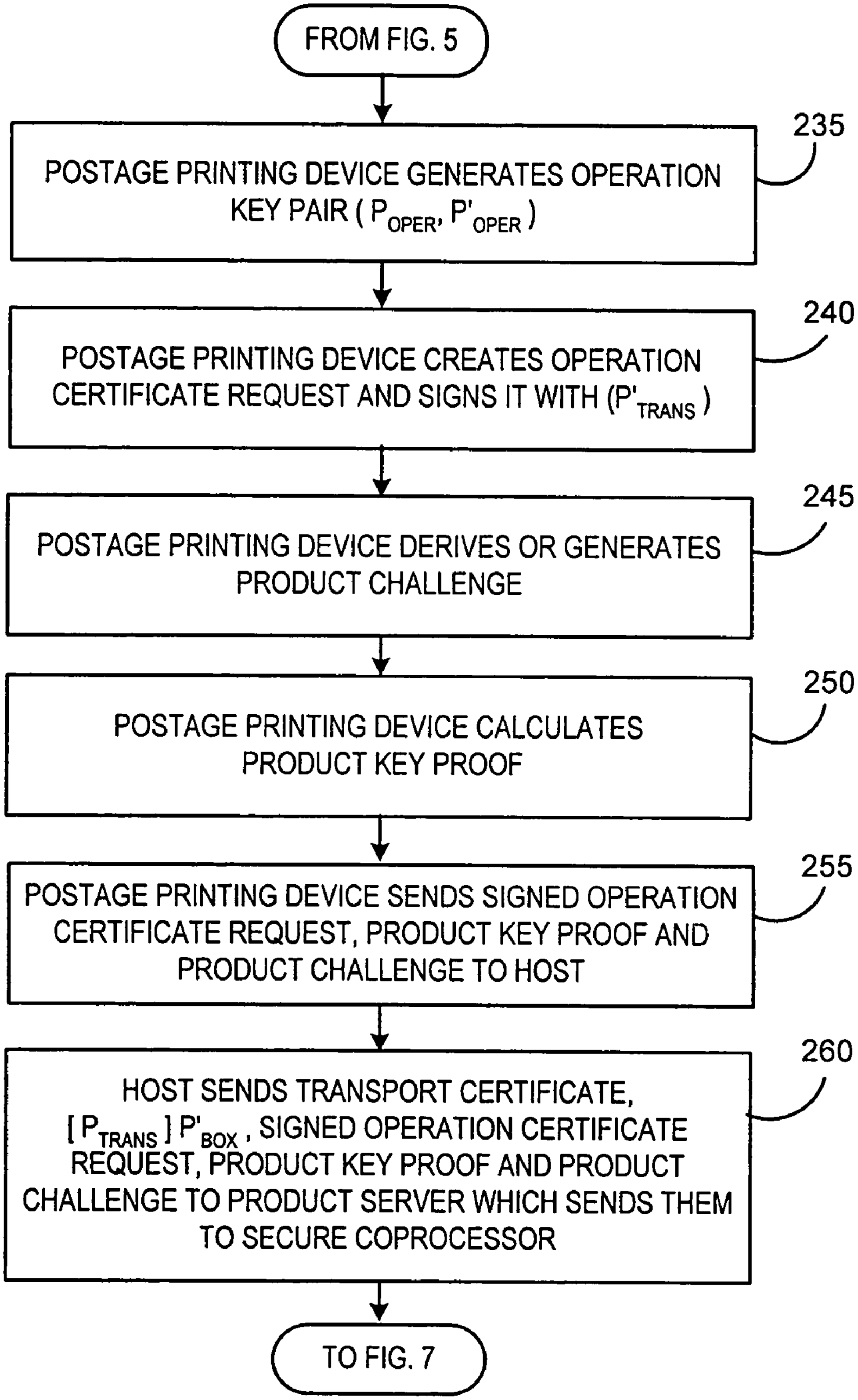
Figure 7:
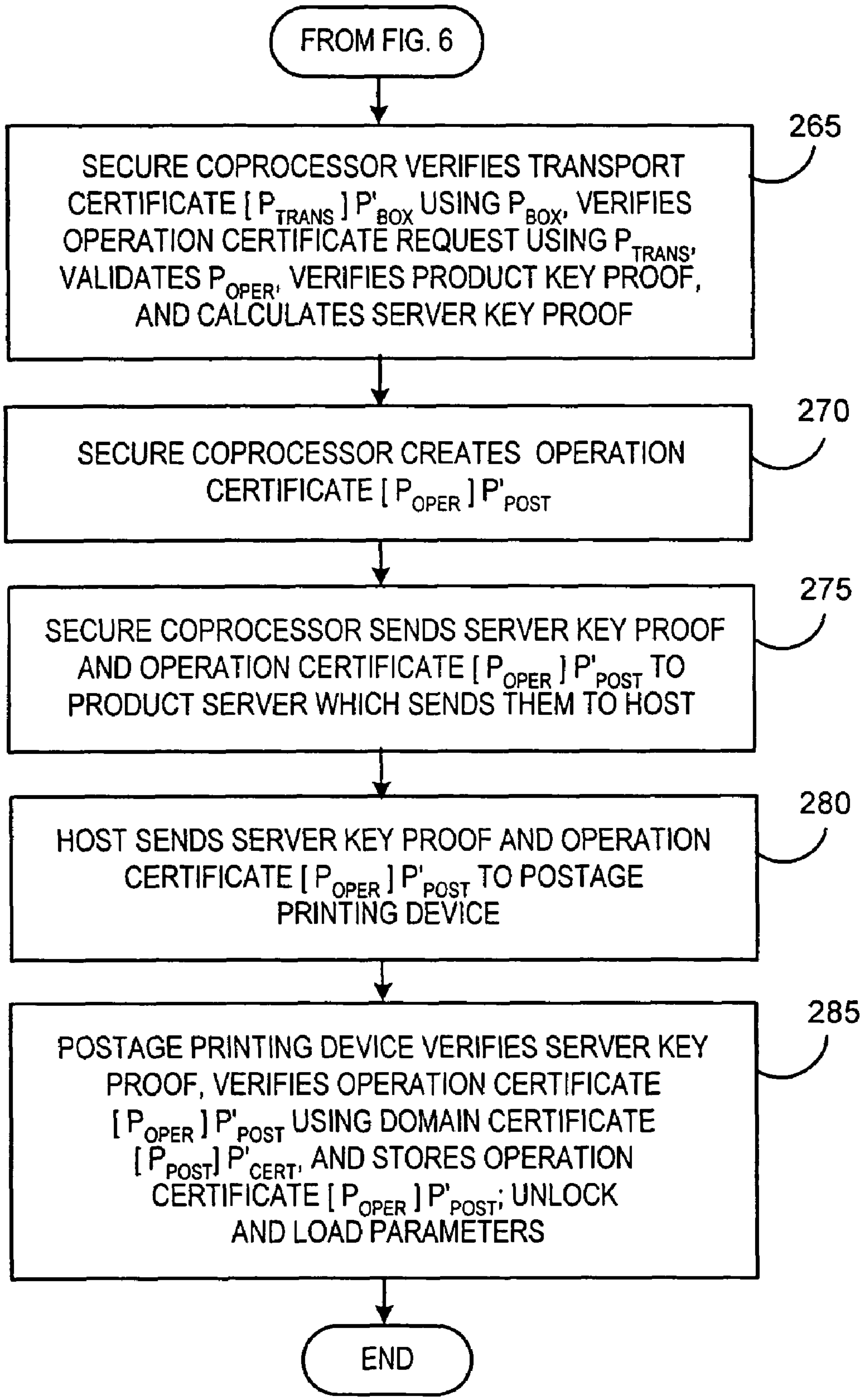

FIGS. 5, 6 and 7 are flowcharts showing a process for registering and parameterizing a postage printing device 25 according to a preferred embodiment of the invention. Before the process of FIGS. 5, 6 and 7 may be executed, secure coprocessor 40 must be provided with the manufacturing certificate $[P_{box}]$ $P'_{cert}$ and the root certificate $[P_{cert}]$ $P'_{cert}$.

Referring to FIG. 5, the process begins at step 200, where host computer 45 requests the transport certificate $[P_{trans}]$ $P'_{box}$ from postage printing device 25. At step 205, postage printing device sends the transport certificate $[P_{trans}]$ $P'_{box}$ to host computer 45 which, as seen in step 210, sends it to product server 35 which in turn sends it to secure coprocessor 40. Next, at step 215, secure coprocessor 40 verifies the transport certificate $[P_{trans}]$ $P'_{box}$. Also at step 215, secure coprocessor 40 generates or derives a server challenge and sends the server challenge to product server 35. In the preferred embodiment, the server challenge is a public key generated, for example, using either ANSI X9.62 or X9.63. Next, product server 35 sends the server challenge and a domain certificate $[P_{post}]$ $P'_{cert}$ to host computer 45. The domain certificate $[P_{post}]$ $P'_{cert}$ includes a domain public key ($P_{post}$) generated by or on behalf of the postal authority, such as the USPS, of the domain in which postage printing device 25 is to be authorized to operate, and is used to ensure that postage printing device 25 is used only in the authorized domain.

At step 225, host computer 45 then sends a start registration command, the server challenge and the domain certificate $[P_{post}]$ $P'_{cert}$ to postage printing device 25. As seen in step 230, postage printing device 25 verifies the domain certificate $[P_{post}]$ $P'_{cert}$ using the provider public key ($P_{cert}$) from the root certificate. Referring now to FIG. 6, postage printing device 25 next generates a new public/private key pair, the operation public/private key pair ($P_{oper}$, $P'_{oper}$), and creates an operation certificate request that includes the public operation key ($P_{oper}$) signed with the private transport key ($P'_{trans}$) At step 245, postage printing device 25 also derives a product challenge. In the preferred embodiment, the product challenge is a public key. Then, at step 250, postage printing device 25 calculates a product key proof using a symmetric key Message Authentication Code (MAC) in accordance with ANSI X9.63. At step 255, postage printing device 25 sends the signed operation certificate request, the product key proof, and the server challenge to host computer 45. As shown in step 260, host computer 45 sends this information to product server 35, which in turn sends it to secure coprocessor 40.

Referring now to FIG. 7, at step 265, secure coprocessor 40 verifies the transport certificate $[P_{trans}]$ $P'_{box}$ using ($P_{box}$) from the manufacturing certificate, verifies the operation certificate request using ($P_{trans}$), and validates ($P_{oper}$) to ensure that it complies with required operating parameters using for example, any known public key validation algorithm. Also at step 265, postage printing device 25 verifies the product key proof using the symmetric key MAC, and calculates a server key proof similarly as done for the product proof key. Next, as seen in steps 270, 275, and 280, secure coprocessor 40 creates an operation certificate $[P_{oper}]$ $P'_{post}$, and sends the server key proof and the operation certificate $[P_{oper}]$ $P'_{post}$ to product server 35, which sends them to host computer 45, which sends them to postage printing device 25. At step 285, postage printing device 25 verifies the server key proof using the symmetric key MAC, verifies the operation certificate $[P_{oper}]$ $P'_{post}$ using the domain certificate $[P_{post}]$ $P'_{cert}$, and stores the operation certificate $[P_{oper}]$ $P'_{post}$. In addition, the transport certificate $[P_{trans}]$ $P'_{box}$ is preferably deleted, thereby removing any evidence of the manufacturing site used to manufacture postage printing device 25. At this point, postage printing device 25 is unlocked, is loaded with market and service level parameters, and the process ends having achieved the following: (i) postage printing device 25 is tied to a particular domain by the operation certificate; (ii) postage printing device 25, product server 35 and secure coprocessor 40 have been mutually authenticated; (iii) postage printing device 25 has a certificate, the operation certificate, that it can present to authenticate itself and conduct secure communications in the future; and (iv) any ties to the manufacturing location and particular secure coprocessor have been deleted.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of manufacturing a postage printing device at a manufacturing station having a manufacturing station public/private key pair and registering said postage printing device for operation under the authority of a registering entity having a registering entity public/private key pair, the method comprising:

storing a root certificate in said postage printing device, said root certificate comprising the registering entity public key signed by the registering entity private key;

generating a transport public/private key pair for said postage printing device, and storing at least said transport private key in said postage printing device;

generating a transport certificate at said manufacturing location, said transport certificate comprising said transport public key signed by said manufacturing station private key;

said manufacturing station sending said transport certificate and a manufacturing certificate to said postage printing device, said manufacturing certificate comprising said manufacturing station public key signed by said registering entity private key;

said postage printing device verifying said manufacturing certificate using said root certificate stored in said postage printing device and verifying said transport certificate using said manufacturing certificate;

storing said transport certificate in said postage printing device;

setting said postage printing device to a transport lock state;

generating a domain certificate comprising a postal authority public key signed by said registering entity private key, wherein said postal authority is a postal authority for a domain in which said postage printing device is authorized to operate;

verifying said domain certificate at said postage printing device using said root certificate stored in said postage printing device;

generating an operation public/private key pair for said postage printing device;

generating an operation certificate, said operation certificate comprising the operation public key signed by a private key of said postal authority corresponding to said postal authority public key; and storing said operation certificate in said postage printing device.

2. A method according to claim 1, said step of generating the transport public/private key pair being performed by said postage printing device.

3. A method according to claim 1, said manufacturing station including a secure coprocessor, said manufacturing station public/private key pair being associated with and unique to said secure coprocessor.

4. A method according to claim 3, said step of generating the transport certificate being performed by said secure coprocessor, the method further comprising sending the transport certificate from said secure coprocessor to said postage printing device.

5. A method according to claim 4, wherein before the step of generating the transport certificate the method further comprises:

said postage printing device generating a transport certificate request, said transport certificate request being sent to said secure coprocessor; and said secure coprocessor verifying said transport certificate request.

6. A method according to claim 5, said transport certificate request comprising first data signed by said transport private key, said first data including said transport public key, said secure coprocessor verifying said transport certificate request using said transport public key.

7. A method according to claim 1, further comprising said postage printing device validating said registering entity private key before the step of storing the root certificate.

8. A method according to claim 1, said manufacturing station comprising a manufacturing station computer coupled to a secure coprocessor.

9. A method according to claim 1, said registering entity being a provider of said postage printing device.

10. A method according to claim 1, further comprising verifying said transport certificate before the step of generating an operation certificate.

11. A method according to claim 1, further comprising, before the step of storing the operation certificate, verifying said operation certificate using said domain certificate.

12. A method according to claim 1, said operation certificate being created by a registration computer system, the method further comprising said postage printing device and said registration computer system exchanging first and second challenges and exchanging and verifying first and second corresponding key proofs.

13. A method according to claim 11, said steps of generating said operation public/private key pair and verifying said operation certificate being performed by said postage printing device.

14. A method according to claim 13, said operation certificate being created by a registration computer system comprising a product server and a secure coprocessor coupled thereto.

15. A method according to claim 14, said registration computer system being located remotely from said postage printing device.

16. A method according to claim 1, further comprising deleting said transport certificate from said postage printing device sometime after said operation certificate is generated.

* * * * *